United States Patent [19]

Chattha

[11] Patent Number: 5,183,865
[45] Date of Patent: Feb. 2, 1993

[54] THERMOSETTABLE POWDER COMPOSITIONS OF POLYMALEIMIDE AND ALLYL-FUNCTIONAL PREPOLYMER

[75] Inventor: Mohinder S. Chattha, Northville, Mich.

[73] Assignee: Ford Motor Company, Dearborn, Mich.

[21] Appl. No.: 642,103

[22] Filed: Jan. 16, 1991

Related U.S. Application Data

[62] Division of Ser. No. 289,856, Dec. 27, 1988, abandoned.

[51] Int. Cl.$^5$ .................. C08L 63/10; C08L 67/06; C08L 79/02; C08L 81/02
[52] U.S. Cl. .................. 525/530; 525/419; 525/445; 525/451; 525/529; 525/539; 525/934
[58] Field of Search .............. 525/445, 529, 530, 419, 525/451, 539

[56] References Cited

U.S. PATENT DOCUMENTS

| | | | |
|---|---|---|---|
| 4,100,140 | 7/1978 | Zahir et al. | 526/277 |
| 4,127,615 | 11/1978 | Zahir et al. | 525/502 |
| 4,130,600 | 12/1978 | Zahir et al. | 525/530 |
| 4,131,632 | 12/1978 | Suzuki et al. | 525/518 |

*Primary Examiner*—Robert E. Sellers
*Attorney, Agent, or Firm*—Lorraine S. Melotik; Roger L. May

[57] ABSTRACT

This invention is directed to a shelf-stable, powder composition adapted to form a high $T_g$, thermally stable, impact resistant thermoset material. The composition consists essentially of a mixture of an allyl-functional prepolymer component and polymaleimide component. The allyl-functional prepolymer component is the reaction product of an aromatic allyl-functional compound and a modifying compound wherein the compounds contain mutually reactive funtionalities such as an aromatic allyl-functional epoxide compound and a modifying amine compound.

6 Claims, No Drawings

THERMOSETTABLE POWDER COMPOSITIONS OF POLYMALEIMIDE AND ALLYL-FUNCTIONAL PREPOLYMER

This is a division of application Ser. No. 289,856, filed Dec. 27, 1988, now abandoned.

Field of the Invention

The invention is directed to a thermosettable powder composition. More particularly, the composition consists essentially of a powder mixture of an allyl-functional prepolymer and polymaleimide which cure at elevated temperatures to form thermally stable, impact resistant polymeric materials having a high glass transition temperature (i.e., having a high $T_g$).

BACKGROUND OF THE INVENTION

It is desirable to have thermosettable compositions which form polymeric materials stable at elevated temperatures and useful in making composites, adhesives, and coatings. Polyimides are known to offer desirable high temperature properties. Many polyimide compositions, however, are based upon condensation chemistry, which tends to result in the formation of voids in the cured polymeric material. Maleimides, on the other hand, provide void-free cross-linked polymeric materials which exhibit good high temperature stability.

Zahir et al, in U.S. Pat. No. 4,100,140, disclose the manufacture of cross-linked Polymers by reacting polymaleimides with alkenylphenols or alkenylphenol ethers. According to that patent, the reaction mixtures for these polymers are of lower viscosity than the starting mixtures for similar prior art polymers and thus are suitable for the manufacture of complex castings. In U.S. Pat. No. 4,130,600, Zahir et al disclose a thermosetting mixture which contains polymaleimides, epoxide compounds having at least one allyl group and, optionally, curing agents for the epoxide compounds and/or curing accelerators for epoxide resin mixtures. In U.S. Pat. No. 4,127,615, Zahir et al disclosed a thermosetting mixture which contains polymaleimides, alkenylphenols and/or alkenylphenol ethers, epoxide compounds with or without allyl groups and, optionally, curing accelerators for epoxide resins. According to Zahir et al, the compositions comprising epoxide compounds yield thermosetting polymers which have high dimensional stability at high temperatures. While Zahir et al have described their compositions as storage-stable, such compositions have less than desirable storage stability since the compositions contain free epoxide groups which react with, e.g., curing agents or phenol which may be present in the composition encouraged by the accelerators which are generally present in the composition. We also have found that embodiments of these compositions of Zahir et al tend to be brittle, i.e., lack the toughness and flexibility desired for such materials. The present invention composition overcomes the disadvantages of such prior art compositions.

DISCLOSURE OF THE INVENTION

This invention is directed to a shelf stable, powder composition adapted to form a hi $T_g$, thermally stable, impact-resistant thermoset material. The composition comprises an intimate mixture of: (A) allyl-functional prepolymer component having a molecular weight between about 300 and about 3000 and (B) polymaleimide component, wherein the allyl-functional prepolymer component and the polymaleimide component are present in the composition in amounts sufficient to provide between about 0.8 and 1.2 maleimide groups of the polymaleimide component for each allyl group present on the allyl-functional prepolymer component. The allyl-functional prepolymer component is a modified allyl-functional compound. This prepolymer is the reaction product of an aromatic allyl-functional compound, which additionally contains a first reactive functionality, with a modifying compound containing a second reactive functionality capable of reacting with the first reactive functionality. The first reactive functionality and the second reactive functionality are selected from the following reactive functionality pairs: hydroxyl and epoxide, hydroxyl and carboxyl, epoxide and carboxyl, epoxide and amine, or epoxide and thiol. The allyl-functional compound and modifying compound are reacted in amounts sufficient to react substantially all of the carboxyl, amine, thiol, and epoxide functionalities which may be present (in a reaction mixture) on the allyl-functional compound and the modifying compound.

Preferably, the polymaleimide is a bismaleimide. Additionally, the molecular weight of the prepolymer preferably is between about 350 and about 2500.

In another aspect, the invention is directed to a method for forming a high $T_g$, thermally stable, impact resistant thermoset material, which method comprises:

reacting at a temperature between about 100° C. and about 270° C.:

(A) allyl-functional prepolymer component: (i) having a molecular weight between about 300 and about 3000 and (ii) being the reaction product of:

(a) an aromatic allyl-functional compound additionally containing a first reactive functionality; and (b) a modifying compound containing a second reactive functionality capable of reacting with the first reactive functionality of compound (a), the first reactive functionality and the second reactive functionality being selected from the following reactive functionality pairs: hydroxyl and epoxide, hydroxyl and carboxyl, epoxide and carboxyl, epoxide and amine, epoxide and thiol, compound (a) and compound (b) being reacted in an amount sufficient to react substantially all of the carboxyl, amine, thiol, and epoxide functionalities which may be present on compound (a) and compound (b) (in the reaction mixture); and (B) polymaleimide component, in such molar proportion that for each allyl group present on the allyl-functional prepolymer component (A) there are between about 0.8 and about 1.2 maleimide groups of the polymaleimide component (B).

Advantageously, the composition of this invention, in contrast to those of the Zahir et al patents mentioned above which contain free epoxide groups, does not contain any free epoxide groups (and is substantially free of other reactive groups like carboxyl, thiol and amine) and thus has excellent storage stability.

Additionally, because the composition of this invention consists essentially of an allyl-functional prepolymer and a polymaleimide which are subject to only two crosslinking reactions during curing at elevated temperatures, the resulting thermoset polymers comprise a substantially homogeneous crosslinking network. That is, the crosslinking reactions between the components of this invention composition comprise (1) mainly reaction of the maleimide with allyl functionality and (2) some degree of free radical reactions of the maleimide group. On the other hand, in a composition mixture taught by Zahir et al which comprises polymaleimides, alkenylphenols, and epoxide compounds, crosslinking reactions between these components will additionally include a third crosslinking reaction, i.e., reaction of the phenolic hydroxyl of the alkenylphenols with the epoxide group of the epoxide compounds. Further it has been found that polymeric materials formed from such a composition as that of Zahir et al comprising epoxide compounds are heterogeneous in that they comprise "pockets" within the crosslinking network which are low $T_g$ polymeric materials formed primarily by self-condensation of epoxide groups. Advantageously, the homogenous crosslinking network of the thermoset compositions of this invention have more high temperature stability (about 10% higher) and a higher $T_g$ than the epoxy containing compositions of Zahir et al.

Still further, the resultant thermoset polymeric material of this invention possesses greater toughness than the thermoset materials of Zahir et al. This is believed to be the result of extending the allyl-functional compound of this invention with a modifying compound during the formation of the prepolymer. While the above theory has been advanced herein in an effort to explain the excellent properties of the thermoset materials of this invention. Neither its validity nor its understanding, however, is necessary for the practice of this invention.

DETAILED DESCRIPTION OF THE INVENTION

As disclosed above, the present invention is directed to a particularly defined thermosettable powder composition adapted to form a high $T_g$, thermally stable, impact resistant thermoset material. The composition consists essentially of an intimate mixture of: (A) allyl functional prepolymer component, and (B) polymaleimide component. The components of the composition, as well as other aspects of the invention composition, will hereinafter be discussed in greater detail.

Aromatic Allyl-Functional Compound

The allyl-functional prepolymer component has a molecular weight of between about 300 and about 3000, preferably between about 350 and 2500. The allyl-functional prepolymer component is the reaction product of: (a) an aromatic allyl-functional compound additionally containing a first reactive functionality (i.e., in addition to the allyl functionality), and (b) a modifying compound containing a second reactive functionality capable of reacting with the first reactive functionality of the aromatic allyl-functional compound (a). The first reactive functionality and the second reactive functionality are selected from the following reactive functionality pairs: hydroxyl and epoxide, hydroxyl and carboxyl, epoxide and amine, epoxide and carboxyl, and epoxide and thiol. According to this invention, the members of the reactive functionality pairs, for example, hydroxyl and epoxide, can correspond to the first reactive functionality and second reactive functionality, respectively, or the second reactive functionality and the first reactive functionality, respectively. That is, if the first reactive functionality is hydroxyl then the second reactive functionality can be epoxide or, if the first reactive functionality is epoxide, then the second reactive functionality can be hydroxyl. The aromatic allyl-functional compound and the modifying compound are reacted in amounts sufficient to react substantially all of the carboxyl, amine, thiol, and epoxide functionalities which may be present in the prepolymer forming composition. That is, according to the invention, it is desired that no epoxide functionality be left unreacted in the prepolymer which would reduce the shelf-stability of the composition or lower the $T_g$ due to non-desired crosslinking reactions as described above. Further, it is desired according to this invention that no or only a small amount of carboxyl, amine and thiol functionalities be left unreacted in the prepolymer. A small amount of carboxyl functionality, for example, has been found to improve the adhesion of the thermoset material. As described above, it has been found necessary in order to obtain the excellent thermal stability, high $T_g$, etc. of the thermoset polymeric material according to this invention to limit the crosslinked network of the material to those which take place between the allyl functionality and the maleimide functionality and between two maleimides functional groups.

Exemplary of aromatic allyl-functional compounds and modifying compounds which may be reacted to form the prepolymer are: (I) diallyl bisphenol compounds reacted with (i) diepoxides or (ii) dicarboxylic acids, (II) monoallyl monophenol compounds reacted with (i) polyepoxides or (ii) polycarboxylic acids (III) aromatic monoallyl monoglycidyl compounds reacted with (i) polycarboxylic acids or (ii) polyamines, and (IV) diallyl glycidyl bisphenol compounds with (i) dicarboxylic acids, (ii) diamines, (iii) bisphenols or (iv) dithiols. In forming the prepolymer according to these sequences, as will be apparent to one skilled in the art in view of the present disclosure, the reactive functionality pairs would respective be: (I) hydroxyl with (i) epoxide or (ii) carboxyl, (II) hydroxyl with (i) epoxide or (ii) carboxyl, (III) epoxide with (i) carboxyl or (ii) amine, and (IV) epoxide with (i) carboxyl, (ii) amine, (iii) hydroxyl, or (iv) thiol.

When the prepolymer is the reaction product of a diallyl bisphenol compound and a modifying compound selected from a group consisting essentially of diepoxides and dicarboxylic acids, the aromatic allyl-functional compound and the modifying compound are reacted in a molar ratio between about 1.5:1 and 2:1, more preferably in a molar ratio between about 1.8:1 and 2:1. Exemplary of diallyl bisphenol compounds which may be so employed according to the present invention include diallyl bisphenol A, 4,4'-hydroxy-3,3'-allyldiphenyl, bis-(4-hydroxy-3 allylphenyl) methane and 2,2'-bis-(dihydroxy-3,5-diallylphenyl) propane. Diepoxides, which may be reacted with the allyl-functional compound to form a prepolymer according to the sequence described above are preferably aromatic diepoxides and include, but are not limited to, bisphenol-A diglycidyl ether, diglycidyl resorcinol, and bis-3,4,-epoxy-6-methylcyclohexane methyl adipate. Dicarboxylic acids, which may be reacted with the allyl-functional compound to form a prepolymer according to this sequence are preferably aromatic dicarboxylic acids and include, but are not limited to, phthalic acid, terephthalic acid, isophthalic acid, and 1,4-dicarboxycyclohexane. It is not intended to form a prepolymer according to this invention by reacting the diallyl bisphenol compound with a mixture of modifying compounds, e.g., diepoxides and dicarboxylic acids, but rather with only one of these types modifying compounds. However, as will be apparent to those skilled in the art in view of the present disclosure, compatible mixtures of different diallyl bisphenol compounds, compatible mixtures of different diepoxides, and compatible mixtures of different dicarboxylic compounds may be employed for each of these compounds in forming the prepolymer. This same considerations, with respect to the allyl-functional compound and the modifying compound, applies to the formation of the prepolymer by the reaction sequences described hereinafter.

As described above, according to another embodiment of the invention the prepolymer may also be made by reacting a monoallyl monophenol compound with a compound selected from a group consisting essentially of polyepoxides and polycarboxylic acids. Preferably, these polyepoxides and polycarboxylic acids are aromatic compounds and preferably are diepoxides and dicarboxylic acids, however they may be tri- or tetra-functional compounds. Compatible mixtures of different monoallyl monophenol compounds may be employed in making the prepolymer as can compatible mixtures of different polyepoxides and compatible mixtures of different polycarboxylic compounds. Monoallyl monophenol compounds which may be employed according to the present invention include, but are not limited to, 2-allylphenol, 2-allyl-4,methylphenol and 2-allyl-6-methylphenol Polyepoxides which may be employed in forming the prepolymer according to the sequence include, but are not limited to, diglycidyl bisphenol-A, triglycidly-paminophenol, triglycidylisocyanurate and phenol-formaldehyde glycidyl resins. Polycarboxylic acids which may be employed in the present invention in forming the prepolymer include, but are not limited to, terephthalic acid, 1,3,5-tricarboxybenzene and pyrromellitic acid. Generally, according to such a reaction sequence, the monoallyl monophenol compound and the polyepoxide or polycarboxylic acids are reacted in the stoichiometric ratio so as to react substantially all of the epoxide groups or carboxyl groups as discussed herein previously, e.g., a monoallyl monophenol and a triepoxide (or tricarboxylic acid) would be reacted in about a 3:1 molar ratio. However, a slight excess of the phenol may be present.

The prepolymer, according to another aspect, may be the reaction product of monoallyl glycidyl compounds with either polycarboxylic acids or polyamines. As described previously herein, compatible mixtures of different monoallyl glycidyl compounds, polycarboxylic acids, and polyamines also may be employed in forming the prepolymer. Preferably the polycarboxylic acids or polyamines are aromatic compounds and preferably are dicarboxylic acids or diamines. Monoallyl glycidyl compounds which may be so employed include, but are not limited to, 2-allylphenol glycidyl ether, 2-allyl-4-methylphenol glycidyl ether, and 2-allyl-6-methylphenol glycidyl ether. The polycarboxylic acid which may be so employed in reaction with the allyl-functional compound to form the prepolymer may be selected from the group of polycarboxylic acids mentioned above. Exemplary of polyamine compounds which may be reacted with the allyl-functional compound to form a prepolymer according to this reaction sequence include, but are not limited to, 1,6-benzyldiamine, 1,4-bis-(diaminodiphenyl) sulfone and N,N'-dimethyldiethylene triamine. According to this reaction sequence, the aromatic monoallyl glycidyl compound is reacted with the polycarboxylic acid or the polyamine compound in a near stoichiometric ratio. That is, for example for the reaction of the monoallyl glycidyl compound with a tricarboxylic acid, the reaction mixture would comprise a molar ratio of monoallyl glycidyl compound to tricarboxylic acid compound of about 3 to 1. In the case of the prepolymer being formed from the monoallyl glycidyl compound and the aromatic diamine compound, the reaction composition would comprise the monoallyl glycidyl compound and the aromatic diamine compound in about a 2 to 1 molar ratio. In each instance, the molar ratio would allow for the substantially complete reaction of all of the glycidyl, carboxyl, or amine groups present in the reaction mixture, according to the provisions as described herein.

According to still another embodiment of the invention, the allyl-functional copolymer may be the reaction product of a diallyl glycidyl bisphenol compound reacted with a modifying compound selected from a group consisting essentially of dicarboxylic acids, diamines, bisphenols, and dithiols, these modifying compounds preferably being aromatic compounds. Diallyl glycidyl bisphenol compounds which may be so employed include, but are not limited to, 2,2-diallylbisphenol-A diglycidyl ether and 4,4-diglycidyl-3,3'-diallyldiphenyl. Diamines which may be so employed include, but are not limited to, p-phenylenediamine, 4,4-diaminodiphenylmethane and N,N'-dimethyl ethylenediamine. Diphenols which may be reacted with the allyl-functional compound to make the prepolymer include, but are not limited to, bisphenol-A, resorcinol, and 4,4'-dihydroxydiphenyl sulfone. Dithiols which may be so employed include, but are not limited to, bis-(4-thiophenyl) methane and 4,4'-thiobiphenyl. In this situation involving the diallyl glycidyl bisphenol compound, the diallyl glycidyl bisphenol compound is reacted with those materials mentioned in a near stoichiometric ratio so as to substantially react all glycidyl, carboxyl, thiol and amine group present in the reaction mixture as defined previously herein.

The formation of the allyl-functional prepolymer may be carried out under reaction conditions which will be apparent to those skilled in the art in view of the present disclosure. For example, in forming the prepolymer by the reaction of diallyl bisphenol A with an aromatic diepoxide, the reaction mixture may be heated above 100° C. for a number of hours until all the epoxy has reacted. The reaction can be carried out in the presence of a catalyst or without one as desired. A non-reactive solvent may be employed.

Polymaleimide Component

Another component of the powder composition according to the present invention is a polymaleimide component. Preferably, the polymaleimide is a bismaleimide since the bismaleimide is particularly reactive with the allyl group and also acts as a good solvent for the allyl material. Exemplary of suitable polymaleimides useful in the present invention include, N,N'-hexamethylene-bis-maleimide, N,N'-p-phenylene-bis-maleimide, N,N'-4,4'-diphenylmethane-bis-maleimide, N,N'-4,4'-3,3'-dichlorodiphenylmethane-bis-maleimide, N,N'-4,4'-diphenyl ether-bis-maleimide, N,N'-4,4'-diphenylsulphone-bis-maleimide, the N,N'-bis-maleimide of 4,4'-diamine-triphenyl phosphate, the N,N'-bis-maleimide of 4,4'-diamine-triphenyl thiophosphate, the N,N',N''-tris-maleimide of tris-(4-aminophenyl) phosphate and the N,N',N''-tris-maleimide of tris-(4-aminophenyl) thiophosphate. Also mixtures of two or more of the above-mentioned polymaleimides can be used as the polymaleimide component according to the invention.

The allyl functional prepolymer and the monoallyl component are present in the powder composition in an amount sufficient to provide between about 0.8 and about 1.2 maleimide groups of the polymaleimide component for each allyl group of the allyl functional prepolymer component. Both the allyl functional prepolymer component and the polymaleimide component of the present invention are powder materials and can be readily combined to form a homogeneous intimate mixture of the two components. As can be seen from the component ranges described above, the maleimide groups may be in excess in the powder composition. This is because during heating of the powder composition to a high temperature, the maleimide can condense with other such groups in forming the cross-linked network of the thermoset material.

In order to form a polymeric thermoset material from the powder composition of the invention, the powder composition is heated to a temperature of between about 100° and 270° C., preferably between 150° and 250° C. for a period or time sufficient to form a thermoset material from the powder composition. Selection of optimal temperature and time will be within the skill of one in the art in view of the present disclosure. Such a composition could be heated in a mold or heated outside of a mold and then injected into a mold while heating it further. The composition may also be mixed with fibers, carbon, pigments, dyes, flame-retarding substances, and internal mold lubricants (in order to facilitate removal of the thermoset material from the mold) such as silicon oil, zinc stearate, ATC, as would be apparent to one skilled in the art in view of the present disclosure.

As described hereinbefore, it has been found that the present composition is adapted to form a thermoset material which exhibits excellent thermally stability, impact resistance, and a high $T_g$. When compared to thermoset materials made, e.g., of three components according to the Zahir et al patent (polymaleimides, alkenylphenols and/or alkenylphenol ethers, and epoxide compounds), the present two component compositions (which comprises a non-epoxide functional prepolymer of alkenyl phenyl and an epoxide compound materials) are substantially better in these properties. For example, it has been found that the decomposition temperature of the present invention thermoset material exhibits about a 10% increase in the decomposition temperature when compared to thermoset materials made from a composition comprising the three reactants. i.e., embodiments of the present invention thermosets begin to decompose at 330° C. rather than 300° C. for a comparable three component Zahir et al material.

The powder composition can be used to make thermoset composite materials useful as load bearing, heat resistant, thermally stable, tough parts for use, e.g., under the hood of automobiles. The composition is also adapted to be used to form a coating on articles subject to high temperatures, e.g., to coat articles used under the hood of an automobile or near the exhaust system. The composition is also useful to form thermoset encapsulants (potting compounds) for electrical devices subjected to high temperatures during operation. It also has been found that embodiments of thermoset materials according to the present invention two component compositions exhibit less creep at high temperatures and are more resistant to oils and lubricants than comparable compositions according to the Zahir et al patent composition comprising three components.

The invention will be further understood by referring to the following detailed examples. It should be understood that the specific examples are presented by way of illustration and not by way of limitation.

THERMAL CHARACTERIZATION

Thermal decomposition of the polymers made according to the following examples is studied with a du Pont Thermal Gravimetric Analyzer (TGA). The initial softening points are determined with a du Pont 943 Thermal Mechanical Analyzer (TMA) employing the penetration mode with a heating rate of 10° C./min. The cure temperature and the heat of reaction are determined with a duPont 910 Differential Scanning Colorimeter (DSC) at the heating rate of 5° C./min. under argon. The tensile storage modulus, E', and loss tangent tan δ, which are indicative of the stiffness of the polymer, are determined using a Polymer Laboratories (U.K.) Dynamic Mechanical Thermal Analyzer (DMTA) in dual cantilever mode. The cured polymer samples are subjected to small oscillating deformation at 0.1, 1.0 and 10 Hz while the temperature is increased from 50° C. to 450° C. at 1° C./min.

EXAMPLE 1

(A) A composition according to this invention is prepared in part (A) of this example as follows. Diallylbisphenol-A, 8.7 parts by weight, and diglycidylbisphenol-A (Epon 828, trademark, Shell Chemical Co.), 4.7 parts by weight, are mixed in a beaker and heated for twenty hours at 140° C. with stirring to form the prepolymer. The infrared and nuclear magnetic resonance spectra of the prepolymer product is then recorded, which shows that the epoxy has completely reacted. Ten parts by weight of bismaleimidodiphenylmethane are added to the reaction beaker and the mixture is stirred at 150° C. In about half an hour, a homogeneous solution is formed. The solution is poured into a shallow pan, allowed to cool, and then ground to a powder. In order to cure the powder composition and form a thermoset material, the powder is placed in an aluminum pan and heated at 150° C. under vacuum until a free-flowing homogeneous melt is produced. It is then further heated at 150° C. for one hour and subsequently at 250° C. for four hours to produce a thermoset polymer material.

(B) A comparative composition not according to this invention is prepared as follows. Diallylbisphenol-A (8.7 parts by weight), Epon 828 (trademark, Shell Chemical Co.) (4.7 parts by weight) and bismaleimidodiphenylmethane (10 parts by weight) are mixed in a beaker and heated at 140° C. with stirring. A homogeneous melt is readily produced. The melt is placed in an aluminum pan and heated in a vacuum oven at 150° C. for one hour and then at 250° C. for four hours to form a thermoset polymer material.

Test samples from thermoset polymer compositions A and B are subjected to TGA as outlined earlier. Polymer A shows weight loss at 410° C. while polymer B starts decomposing at 380° C. These results show the higher thermal stability of polymer A as compared to that of polymer B. DMTA of test samples of polymers A and B show that the loss tangent maxima are displayed at 260° C. and 245° C. respectively. Thus Polymer A exhibits more toughness at higher temperatures than polymer B. DMTA further shows that onset of thermal degradation for Composition A (360° C.) is about 30° C. higher than Composition B. These results additionally show the higher thermal stability of polymer A as compared to that of polymer B.

EXAMPLE 2

The experiment of this example is carried out as described in Example 1, except that 8 parts by weight of bismaleimidodiphenylmethane are employed instead of its amount used therein. Polymer samples A and B are subjected to same thermal tests as described in Example 1. Polymer A shows weight loss (TGA) at 415° C. while polymer B starts decomposing at about 380° C. DMTA of test samples of polymers A and B exhibit loss tangent maxima at 280° C. and 255° C., respectively.

EXAMPLE 3

(A) A composition according to this invention is prepared in part (A) or this example as follows. Diallylbisphenol-A, 8.7 parts by weight, and epoxy resin Araldite XU 252 (Ciba-Geigy), 4.3 parts by weight, are reacted for 16 hours at 140° C. The resulting solid product is reacted with 10.2 parts by weight of bismaleimidodiphenylmethane as described in Example 1 to form a thermoset polymer material.

(b) A comparative composition not according to this invention is prepared as follows. Diallylbisphenol-A, 8.7 parts by weight, Araldite XU 252, 4.3 parts by weight, and bismaleimidodiphenylmethane, 10.2 parts by weight, are mixed in a beaker and are formed into a thermoset polymer material as described in Example 1.

TGA of polymers A and B show that A starts losing weight at 415° C while polymer B decomposes at 390° C. DMTA of polymers A and B exhibit loss tangent maxima at 285° C. and at 265° C., respectively.

EXAMPLE 4

Diallylbisphenol-A, 8.5 parts by weight, Epon 828, 3 parts by weight, and bismaleimidodiphenylmethane, 10.1 parts by weight, were employed to prepare polymer sample A (prereacted) and B (reacted in situ) according to the reaction conditions as described in Example 1.

Test samples from compositions A and B are subjected to TGA and DMTA as described earlier. Polymer A starts showing weight loss (TGA) at 420° C. while Polymer B does that at 390° C. DMTA of polymers A and B show that the loss tangent maxima are displayed at 265° C. and 250° C. respectively.

EXAMPLE 5

(A) A composition according to the present invention is made in part (A) of this example as follows. Diallylbisphenol-A, 15.5 g, terephthalic acid, 8.4 g, and 150 ml toluene are placed in a round bottom flask. Tetraisopropyl titanate, 0.25 g, is added to the reaction mixture (as a catalyst) and the mixture is refluxed for three hours using a Dean-Stark water separator. The solution is cooled to room temperature and is poured into hexane to precipitate the prepolymer Half of the prepolymer precipitate, 11.3 parts by weight, are mixed with 8.6 parts by weight of bismaleimidodiphenylmethane and the composition is cured according to the reaction conditions described in Example 1 to form a thermoset polymer material.

(B) A comparitive composition not according to this invention is Prepared as follows. Diallylbisphenol-A 7.75 parts by weight, terephthalic acid, 4.2 parts by weight, and bismaleimidodiphenylmethane, 8.6 parts by weight, are mixed in a beaker and the mixture is cured as described in Example 1 to form a thermoset polymer material.

Thermal Mechanical Analysis (TMA) of the thermoset compositions A and B show that A softens at 265° C. while B softens at 219° C.

EXAMPLE 6

(A) A composition according to this invention is prepared as follows. Diglycidylbisphenol-A, 5.7 parts by weight, and 2-allylphenol, 6.8 parts by weight, are reacted at 140° C. for twenty hours. The resulting product is mixed with 7.2 parts by weight of bismaleimidodiphenylmethane and the polymer is cured as described in Example 1 to form a thermoset polymer material.

(B) A composition not according to this invention is made as follows. Diglycidylbisphenol-A, 5.7 parts by weight, 2-allylphenol, 6.8 parts by weight, and bismaleimidodiphenylmethane, 7.2 parts by weight, are mixed in a beaker and the sample is cured as described in Example 1.

TMA results show that polymer A softens at 235° C. while B starts softening at 108° C.

EXAMPLE 7

Polymer samples A and B were prepared as described in Example 6 by employing 7.4 parts by weight of 2-allyl-4-methylphenol instead of 2-allylphenol used therein.

TMA results show that polymer A softens at 237° C. while B starts softening at 110° C.

EXAMPLE 8

(A) A composition according to this invention is made as follows. 2-Allylphenolglycidyl ether, 7.6 parts by weight, 5 parts by weight of 4,4'-diaminodiphenyl sulfone, and 100 parts by weight of toluene, are placed in a flask and refluxed for four hours. The toluene is then evaporated under reduced pressure. The resulting solid product is mixed with 9.2 parts by weight of bismaleimidodiphenylmethane and the composition is cured as described in Example 1 to form a thermoset polymer material.

(B) 2-Allylphenol glycidyl ether, 7.6 parts by weight, 4,4'-diaminodiphenyl sulfone, 5 parts by weight, and bismaleimidodiphenyl methane, 9.2 parts by weight, are placed in a beaker, the mixture is cured as described in Example 1 to form a thermoset polymer material.

Thermal mechanical analysis of polymer A and B show that A softens at 268° C. while polymer B starts showing softening at 102° C.

EXAMPLE 9

Polymer samples A and B are prepared as described in Example 1 by substituting 7.2 parts by weight of N.N'-m-phenylene-bis-maleimide for the bis-maleimide used therein.

DMTA study of polymers A and B display loss tangent maxima at 267° C. and 249° C., respectively.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

I claim

1. A shelf stable, powder composition adapted to form a high $T_g$, thermally stable, impact resistant thermoset material, which composition consists essentially of an intimate mixture of two components:

(A) an allyl-functional prepolymer component: (i) having a number average molecular weight between about 300 and about 3000 and (ii) being the reaction product of:
  (a) an aromatic allyl-functional compound additionally containing a first reactive functionality; and
  (b) a modifying compound containing a second reactive functionality capable of reacting with said first reactive functionality of compound (a), said first reactive functionality and said second reactive functionality being selected from the following reactive functionality pair: epoxide and amine, said compound (a) and compound (b) being reacted in an amount sufficient to react substantially all of said amine and epoxide functionalities which may be present on said compound (a) and compound (b); and
(B) polymaleimide component, said allyl-functional prepolymer component and said polymaleimide component being present in said composition in amounts sufficient to provide between about 0.8 and 1.2 maleimide groups of said polymaleimide component for each allyl group present on said allyl-functional prepolymer component.

2. The shelf stable, powder composition according to claim 1, wherein said compound (a) is an aromatic monoallyl monoglycidyl compound and compound (b) is a polyamine compound.

3. The shelf stable, powder composition according to claim 1, wherein said modifying compound is an aromatic polamine compound.

4. A method for forming a high $T_g$, thermally stable, impact resistant thermoset material, which method comprises:

reacting at a temperature between about 100° C. and about 270° C. a composition which consists essentially of an intimate mixture of two components:

(A) an allyl-functional prepolymer component: (i) having a number average molecular weight between about 300 and about 3000 and (ii) being the reaction product of:
  (a) an aromatic allyl-functional compound additionally containing a first reactive functionality; and
  (b) a modifying compound containing a second reactive functionality capable of reacting with said first reactive functionality of compound (a), said first reactive functionality and said second reactive functionality being selected from the following reactive functionality pair: epoxide and amine, compound (a) and compound (b) being reacted in an amount sufficient to react substantially all of the amine and epoxide functionalities which may be present on said compound (a) and said compound (b); and
(B) polymaleimide component, in such molar proportion that for each allyl group present on said allyl-functional prepolymer component (A) there are between about 0.8 and about 1.2 maleimide groups of said polymaleimide component (B).

5. The method according to claim 4, wherein said compound (a) is an aromatic monoallyl monoglycidyl compound and compound (b) is a polyamine compound.

6. The method according to claim 4, wherein said modifying compound is an aromatic polamine compound.

* * * * *